United States Patent
Lee et al.

(10) Patent No.: US 11,147,071 B2
(45) Date of Patent: Oct. 12, 2021

(54) METHOD AND APPARATUS FOR SUPPORTING MULTIPLE TTIS, MULTIPLE SUBCARRIER SPACINGS, OR MULTIPLE PROCESSING TIMES IN WIRELESS COMMUNICATION SYSTEM

(71) Applicant: LG Electronics Inc., Seoul (KR)

(72) Inventors: Hyunho Lee, Seoul (KR); Yunjung Yi, Seoul (KR); Daesung Hwang, Seoul (KR)

(73) Assignee: LG Electronics Inc.

( * ) Notice: Subject to any disclaimer, the term of this patent is extended or adjusted under 35 U.S.C. 154(b) by 137 days.

(21) Appl. No.: 16/065,736

(22) PCT Filed: Feb. 2, 2018

(86) PCT No.: PCT/KR2018/001461
§ 371 (c)(1),
(2) Date: Jun. 22, 2018

(87) PCT Pub. No.: WO2018/143731
PCT Pub. Date: Aug. 9, 2018

(65) Prior Publication Data
US 2021/0185682 A1    Jun. 17, 2021

Related U.S. Application Data

(60) Provisional application No. 62/590,351, filed on Nov. 23, 2017, provisional application No. 62/587,409, (Continued)

(51) Int. Cl.
*H04W 72/04* (2009.01)
*H04L 1/18* (2006.01)
(Continued)

(52) U.S. Cl.
CPC ...... *H04W 72/0493* (2013.01); *H04B 7/0486* (2013.01); *H04B 7/0632* (2013.01);
(Continued)

(58) Field of Classification Search
CPC ......... H04W 72/0493; H04W 72/0446; H04W 72/0413; H04W 72/04; H04W 72/02;
(Continued)

(56) References Cited

U.S. PATENT DOCUMENTS

2014/0328260 A1   11/2014  Papasakellariou et al.
2016/0094315 A1   3/2016   Noh et al.
(Continued)

FOREIGN PATENT DOCUMENTS

CN     102301792     12/2011
CN     104350695     2/2015
(Continued)

OTHER PUBLICATIONS

Ericsson, "On UL sTTI layout," R1-1611508, 3GPP TSG-RAN WG1 #87, Reno, USA, dated Nov. 14-18, 2016, 8 pages.
(Continued)

*Primary Examiner* — Afshawn M Towfighi
(74) *Attorney, Agent, or Firm* — Fish & Richardson P.C.

(57) ABSTRACT

A method of transmitting uplink (UL) control information for a user equipment (UE) for supporting a plurality of TTI lengths, a plurality of subcarrier spacing, or a plurality of processing times in a wireless communication system is performed by the UE and includes mapping the UL control information to a radio resource in a TTI including two or three symbols, the UL control information including HARQ-ACK, a rank indicator (RI), a channel quality indicator (CQI), or a precoding matrix indicator (PMI), and transmitting the UL control information to a base station, wherein, when there is no symbol to which a DMRS is mapped in the
(Continued)

TTI, HARQ-ACK is mapped to a first symbol in the TTI in descending order from a highest frequency index resource element (RE) and the RI is mapped to the other symbol in the TTI in descending order from a highest frequency index RE.

17 Claims, 9 Drawing Sheets

Related U.S. Application Data filed on Nov. 16, 2017, provisional application No. 62/577,654, filed on Oct. 26, 2017, provisional application No. 62/561,631, filed on Sep. 21, 2017, provisional application No. 62/549,902, filed on Aug. 24, 2017, provisional application No. 62/548,987, filed on Aug. 23, 2017, provisional application No. 62/544,151, filed on Aug. 11, 2017, provisional application No. 62/541,104, filed on Aug. 4, 2017, provisional application No. 62/501,728, filed on May 4, 2017, provisional application No. 62/469,465, filed on Mar. 9, 2017, provisional application No. 62/454,889, filed on Feb. 5, 2017.

(51) Int. Cl.
*H04B 7/0456* (2017.01)
*H04L 1/16* (2006.01)
*H04B 7/06* (2006.01)

(52) U.S. Cl.
CPC ......... *H04B 7/0639* (2013.01); *H04L 1/1664* (2013.01); *H04L 1/1819* (2013.01); *H04L 1/1896* (2013.01); *H04W 72/0413* (2013.01); *H04W 72/0446* (2013.01)

(58) Field of Classification Search
CPC .. H04B 7/0632; H04B 7/0486; H04B 7/0639; H04B 7/0413; H04L 1/1664; H04L 1/1819; H04L 1/1896
See application file for complete search history.

(56) References Cited

U.S. PATENT DOCUMENTS

| 2019/0036676 | A1* | 1/2019 | Takeda | H04W 72/0446 |
| 2019/0190663 | A1* | 6/2019 | Sahlin | H04L 1/1854 |
| 2019/0199468 | A1* | 6/2019 | Zhao | H04L 1/0025 |

FOREIGN PATENT DOCUMENTS

| CN | 104426633 | 3/2015 |
| CN | 104754709 | 7/2015 |
| CN | 106102180 | 11/2016 |
| CN | 105830383 | 8/2018 |
| EP | 3101834 | 12/2016 |
| JP | 2015133621 | 7/2015 |
| JP | 2019533332 | 11/2019 |
| KR | 10-2012-0033283 | 4/2012 |
| KR | 10-1510582 | 4/2015 |
| KR | 10-2015-0129318 | 11/2015 |
| KR | 10-2015-0132368 | 11/2015 |
| KR | 10-2016-0037766 | 4/2016 |
| KR | 1020160056820 | 5/2016 |

OTHER PUBLICATIONS

Japanese Office Action in Japanese Application No. 2019-520971, dated Jun. 23, 2020, 8 pages (with English translation).
Huawei et al., "sUCI on sPUSCH". R1-1611162, 3GPP TSG RAN WGI Meeting #87, Reno, USA, Nov. 5, 2016, See sections 1-2.
Huawei et al., "UCI on sPUSCH", R1-1608639, 3GPP TSG RAN WGI Meeting #86bis, Lisbon, Portugal, Oct. 1, 2016 See sections 2-3.2.
Ericsson, UCI on sPUSCH with Shmt TT1, R1-1611516, 3GPP TSG RAN WGI Meeting #87. Reno, USA, Nov. 4, 2016, See sections 1-2.2.
Ericsson, "UCI on sPUSCH with Short TTI". R1-1610328, 3GPP TSG RAN WGI Meeting #86bis, Lisbon, Portugal, Sep. 30, 2016, See sections 1-2.2.1.
Ericsson, "UCI on sPUSCH with Short TTI", R1-1610473, 3GPP TSG RAN WGI Meeting #86bis, Lisbon, Portugal, Oct. 18, 2016 See sections 1-2.2.1.
International Search Report and Written Opinion in International Application No. PCT/KR2018/001461, dated Apr. 25, 2018, 10 pages.
Huawei, HiSilicon, "UCI on sPUSCH", R1-166154, 3GPP TSG RAN WG1 Meeting #86, Gothenburg, Sweden, Aug. 22-26, 2016, 6 pages.
ZTE, "UCI transmission on sPUSCH in sTTI", R1-1712328, 3GPP TSG RAN WG1 Meeting #90, Prague, Czech Republic, Aug. 21-25, 2017, 3 pages.
Ericsson, "Design aspects of sPUCCH," R1-1610329, 3GPP TSG-RAN WG1 #86 bis, Lisbon, Portugal, dated Oct. 10-14, 2016, 6 pages, XP051150344.
Extended European Search Report in European Application No. 18747880.5, dated Sep. 16, 2020, 12 pages.
NTT Docomo, Inc., "sPUSCH for shortened TTI," R1-1610048, 3GPP TSG RAN WG1 Meeting #86bis, Lisbon, Portugal, dated Oct. 10-14, 2016, 8 pages.
Cao et al., "VoLTE coverage improvement by HARQ and RLC segmentation when TTI bundling is ON," IEEE Information Technology, Networking, Electronic and Automation Control Conference, dated Sep. 5, 2016, 5 pages.
CN Office Action in Chinese Appln. No. 201880008931.2, dated Jun. 22, 2021, 20 pages (with English translation).
Huawei, HiSilicon, "sUCI on sPUSCH," R1-1611162, 3GPP TSG RAN WG1 Meeting #87, Reno, USA, dated Nov. 14-18, 2016, 3 pages.
Wenwen et al., "Research of PUSCH in LTE System," Modem Science & Technology of Telecommunications, Issue 7, dated Jul. 2021, pp. 5-10 (with English Abstract).

* cited by examiner (a) 2 symbol TTI DL structure (b) 3 symbol TTI DL structure (c) 4 symbol TTI DL structure (d) 7 symbol TTI DL structure

METHOD AND APPARATUS FOR SUPPORTING MULTIPLE TTIS, MULTIPLE SUBCARRIER SPACINGS, OR MULTIPLE PROCESSING TIMES IN WIRELESS COMMUNICATION SYSTEM

CROSS-REFERENCE TO RELATED APPLICATIONS

This application is a National Stage application under 35 U.S.C. § 371 of International Application No. PCT/KR2018/001461, filed on Feb. 2, 2018, which claims the benefit of U.S. Provisional Application No. 62/590,351, filed on Nov. 23, 2017, U.S. Provisional Application No. 62/587,409, filed on Nov. 16, 2017, U.S. Provisional Application No. 62/577,654, filed on Oct. 26, 2017, U.S. Provisional Application No. 62/561,631, filed on Sep. 21, 2017, U.S. Provisional Application No. 62/549,902, filed on Aug. 24, 2017, U.S. Provisional Application No. 62/548,987, filed on Aug. 23, 2017, U.S. Provisional Application No. 62/544,151, filed on Aug. 11, 2017, U.S. Provisional Application No. 62/541,104, filed on Aug. 4, 2017, U.S. Provisional Application No. 62/501,728, filed on May 4, 2017, U.S. Provisional Application No. 62/469,465, filed on Mar. 9, 2017, and U.S. Provisional Application No. 62/454,889, filed on Feb. 5, 2017. The disclosures of the prior applications are incorporated by reference in their entirety.

TECHNICAL FIELD

The present invention relates to a wireless communication system, and more particularly, to a method and apparatus for supporting a plurality of transmission time intervals, a plurality of subcarrier spacing, or a plurality of processing times.

BACKGROUND ART

Latency of packet data is one of important performance metrics and one of important objectives in designs of a next-generation mobile communication system as well as LTE, a so-called new RAT, is to reduce latency and to provide rapider Internet access to an end user.

The present invention proposes the feature related to a reference signal in a wireless communication system for supporting reduction in latency.

DISCLOSURE

Technical Problem

An object of the present invention devised to solve the problem lies in an uplink (UL) transmitting operation of a terminal for supporting a plurality of transmission time intervals, a plurality of subcarrier spacing, or a plurality of processing times or a UL receiving operation of an eNB that communicates with the UE, and more particularly, mapping of UL control information, processing in collision of a plurality of UL channels, reporting of capability of a terminal related thereto, or the like.

It is to be understood that both the foregoing general description and the following detailed description of the present invention are exemplary and explanatory and are intended to provide further explanation of the invention as claimed.

Technical Solution

The object of the present invention can be achieved by providing a method of transmitting uplink (UL) control information for a terminal for supporting a plurality of transmission time interval (TTI) lengths, a plurality of subcarrier spacing, or a plurality of processing times in a wireless communication system, the method being performed by the terminal and including mapping the UL control information to a radio resource in a TTI including two or three symbols, the UL control information including hybrid automatic retransmission request-acknowledgement/non-acknowledgement (HARQ-ACK), a rank indicator (RI), a channel quality indicator (CQI), or a precoding matrix indicator (PMI), and transmitting the UL control information to a base station (BS), wherein, when there is no symbol to which a DMRS is mapped in the TTI, HARQ-ACK is mapped to a first symbol in the TTI in descending order from a resource element (RE) of a highest frequency index and the RI is mapped to the other symbol in the TTI in descending order from an RE of a highest frequency index.

Additionally or alternatively, when a demodulation reference signal (DMRS) is positioned in a first symbol in the TTI and a sounding reference signal (SRS) is positioned in a last symbol in the TTI, the HARQ-ACK, the RI, and the CQI/PMI may be mapped to a center symbol in the TTI.

Additionally or alternatively, a maximum number of coded symbols to which the UL control information is to be mapped may be limited by the product of the number of symbols to which the UL control information is mapped and the number of subcarriers corresponding to a channel to which the UL control information is to be transmitted Additionally or alternatively, the number of symbols to which the UL control is mapped may be different for each TTI length.

Additionally or alternatively, a channel to which the UL control information is to be transmitted may be an UL data channel with a TTI having a shorter length than 1 ms.

Additionally or alternatively, when the TTI includes two symbols, and a DMRS is positioned in one of the two symbols, a DMRS for demodulating one UL data channel may be mapped only to some of all RBs.

Additionally or alternatively, the UL control information may be mapped only to an RE having the same frequency index as an RE, to which the DMRS is mapped, in the other of the two symbols, and the UL control information mapped only to the RE having the same frequency as the RE to which the DMRS is mapped may include the HARQ-ACK or the RI.

In another aspect of the present invention, provided herein is a terminal for supporting a plurality of transmission time interval (TTI) lengths, a plurality of subcarrier spacing, or a plurality of processing times in a wireless communication system, the terminal including a receiver and a transmitter, and a processor that controls the receiver and the transmitter, wherein the processor maps uplink (UL) control information to a radio resource in a transmission time interval (TTI) including two or three symbols, the UL control information including hybrid automatic retransmission request-acknowledgement/non-acknowledgement (HARQ-ACK), a rank indicator (RI), a channel quality indicator (CQI), or a precoding matrix indicator (PMI), and the processor transmits the UL control information to a base station (BS), wherein, when there is no symbol to which a DMRS is mapped in the TTI, the HARQ-ACK is mapped to a first symbol in the TTI in descending order from a resource element (RE) of a highest frequency index and the RI is mapped to the other symbol in the TTI in descending order from an RE of a highest frequency index.

Additionally or alternatively, when a demodulation reference signal (DMRS) is positioned in a first symbol in the TTI and a sounding reference signal (SRS) is positioned in a last symbol in the TTI, the HARQ-ACK, the RI, and the CQI/PMI may be mapped to a center symbol in the TTI.

Additionally or alternatively, a maximum number of coded symbols to which the UL control information is to be mapped may be limited by the product of the number of symbols to which the UL control information is mapped and the number of subcarriers corresponding to a channel to which the UL control information is to be transmitted.

Additionally or alternatively, the number of symbols to which the UL control is mapped may be different for each TTI length.

Additionally or alternatively, a channel to which the UL control information is to be transmitted may be an UL data channel with a TTI having a shorter length than 1 ms.

Additionally or alternatively, when the TTI includes two symbols, and a DMRS is positioned in one of the two symbols, a DMRS for demodulating one UL data channel may be mapped only to some of all RBs.

Additionally or alternatively, the UL control information may be mapped only to an RE having the same frequency index as an RE, to which the DMRS is mapped, in the other of the two symbols, and the UL control information mapped only to the RE having the same frequency as the RE to which the DMRS is mapped may include the HARQ-ACK or the RI.

In another aspect of the present invention, provided herein is a method of receiving uplink (UL) control information for a terminal for supporting a plurality of transmission time interval (TTI) lengths, a plurality of subcarrier spacing, or a plurality of processing times in a wireless communication system, the method being performed by a base station (BS) and including receiving UL control information mapped to a radio resource in a TTI including two or three symbols, from the terminal, the UL control information including hybrid automatic retransmission request-acknowledgement/non-acknowledgement (HARQ-ACK), a rank indicator (RI), a channel quality indicator (CQI), or a precoding matrix indicator (PMI), wherein, when there is no symbol to which a DMRS is mapped in the TTI, the HARQ-ACK may be mapped to a first symbol in the TTI in descending order from a resource element (RE) of a highest frequency index and the RI may be mapped to the other symbol in the TTI in descending order from an RE of a highest frequency index.

It is to be understood that both the foregoing general description and the following detailed description of the present invention are exemplary and explanatory and are intended to provide further explanation of the invention as claimed.

Advantageous Effects

According to the present invention, uplink (UL) transmission of a terminal for supporting a plurality of transmission time interval (TTI) lengths, a plurality of subcarrier spacing, or a plurality of processing times may be effectively performed.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Figure 1:
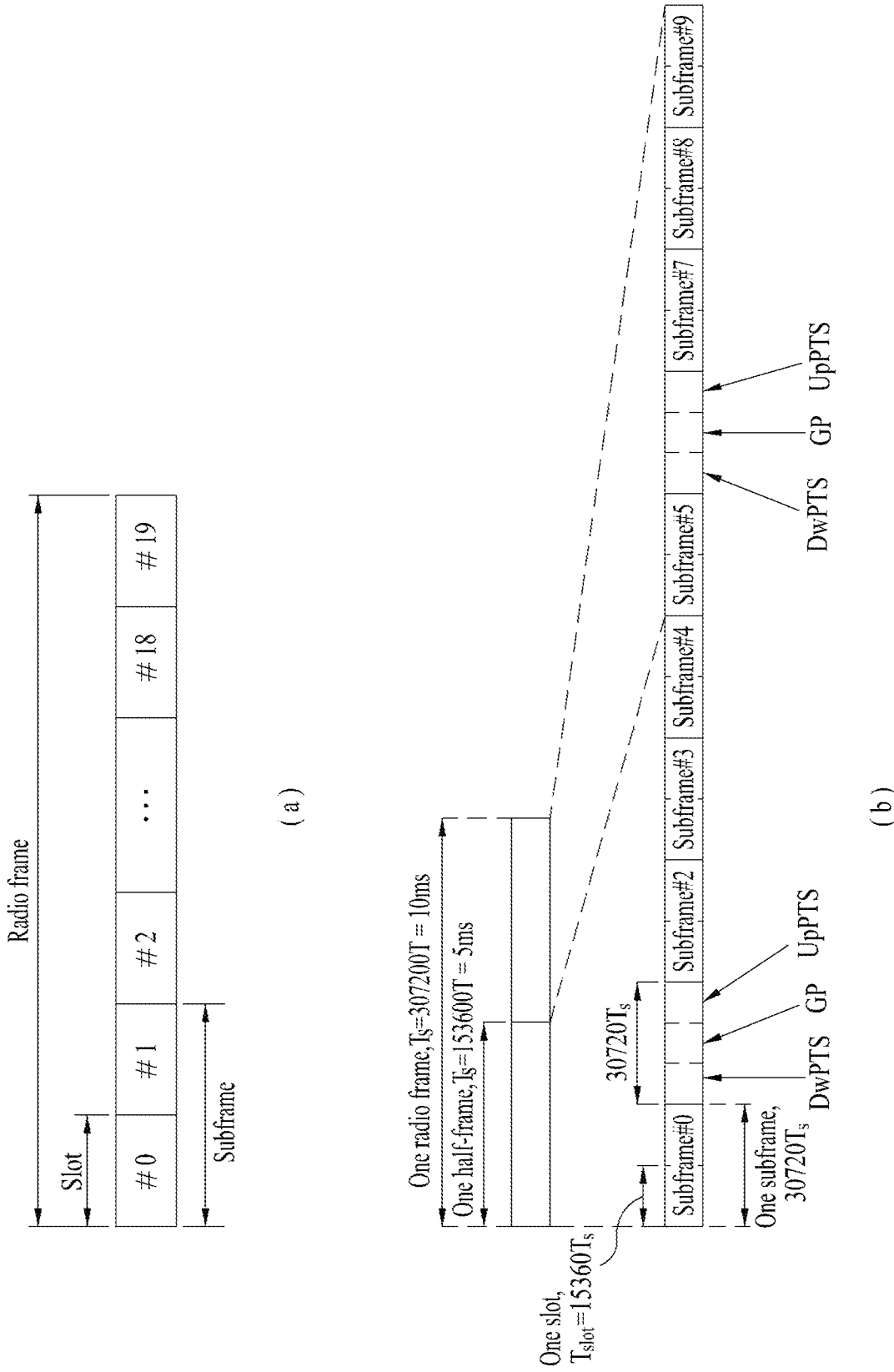
FIG. 1 is a diagram showing an example of a radio frame structure used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/

PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
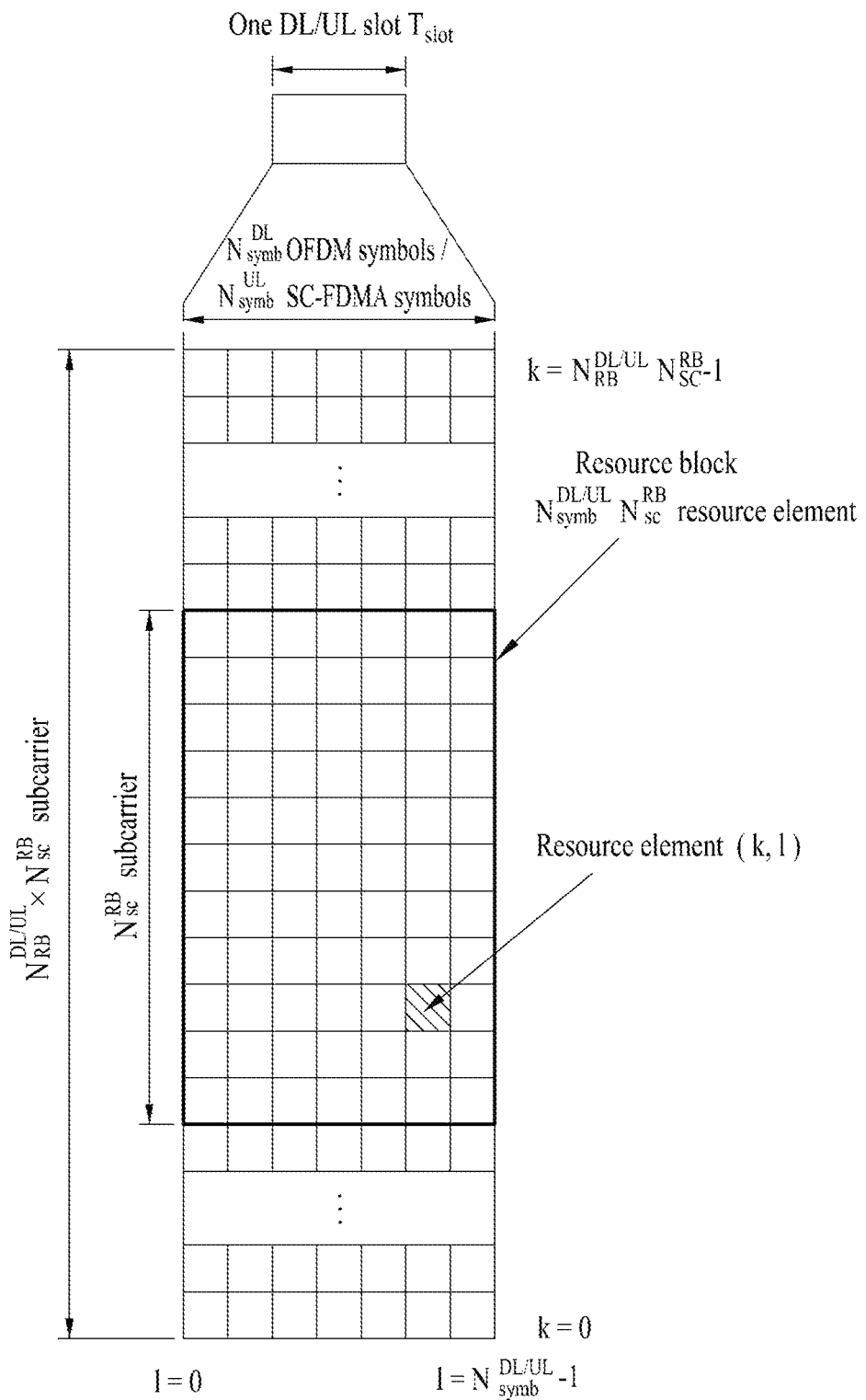
FIG. 2 is a diagram showing an example of a downlink/uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
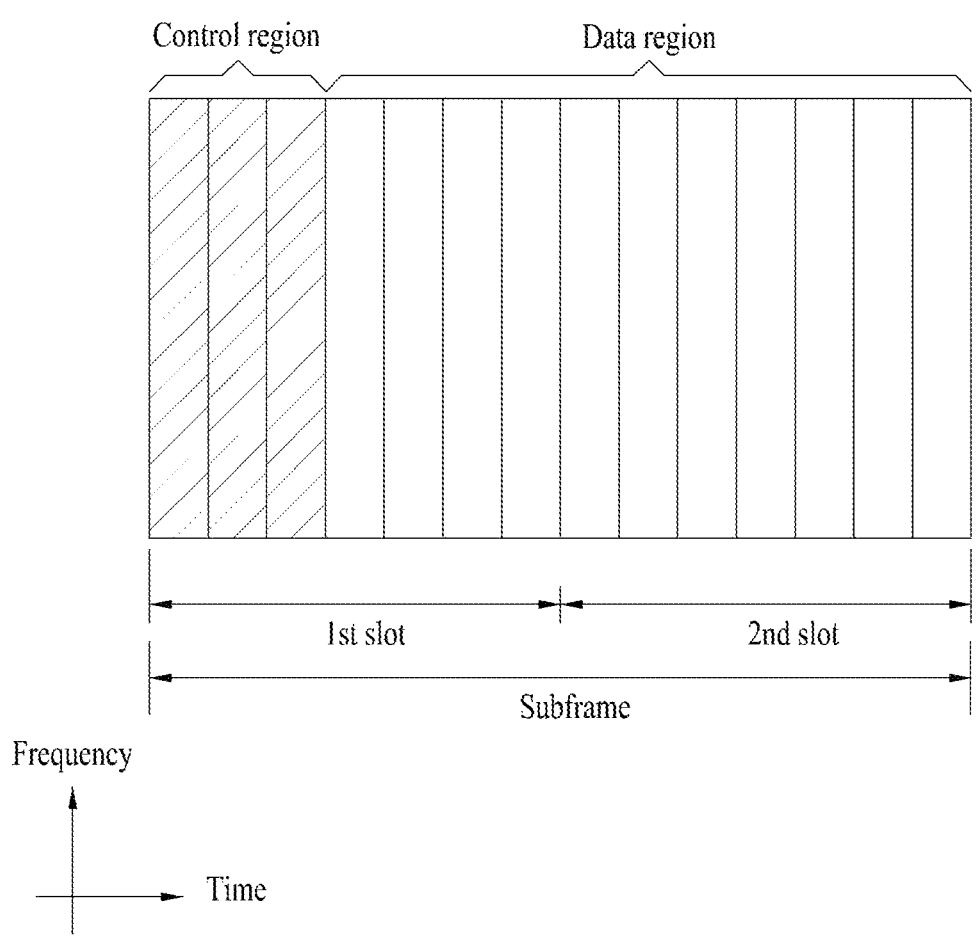
FIG. 3 is a diagram showing an example of a DL subframe structure used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space Type | Aggregation Level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |
| Common | 4 | 16 | 4 |
|  | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
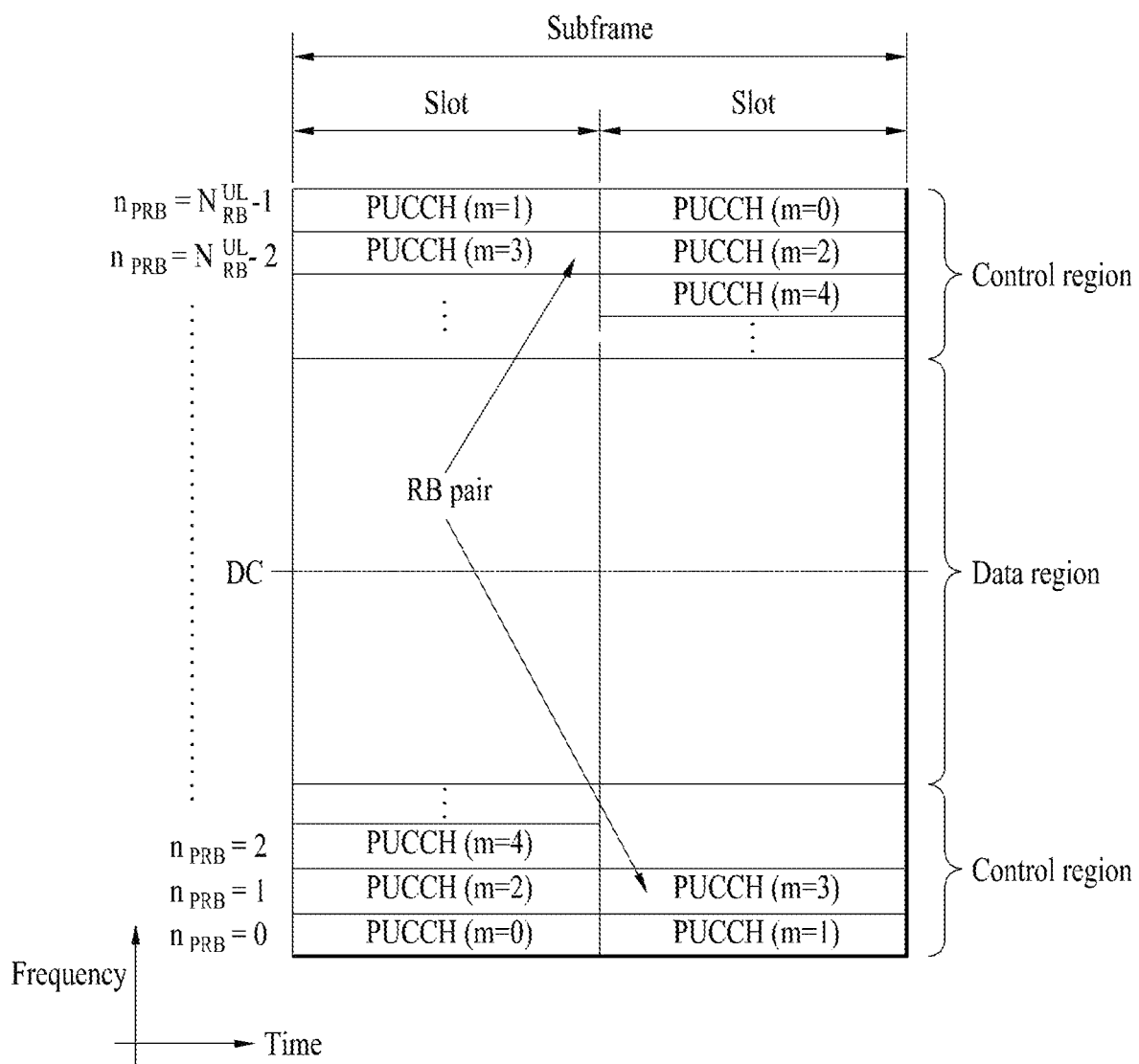
FIG. 4 is a diagram showing an example of a UL subframe structure used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |

TABLE 4-continued

| PUCCH format | Modulation scheme | Number of bits per subframe, $M_{bit}$ | Usage | Etc. |
|---|---|---|---|---|
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

Figure 5:
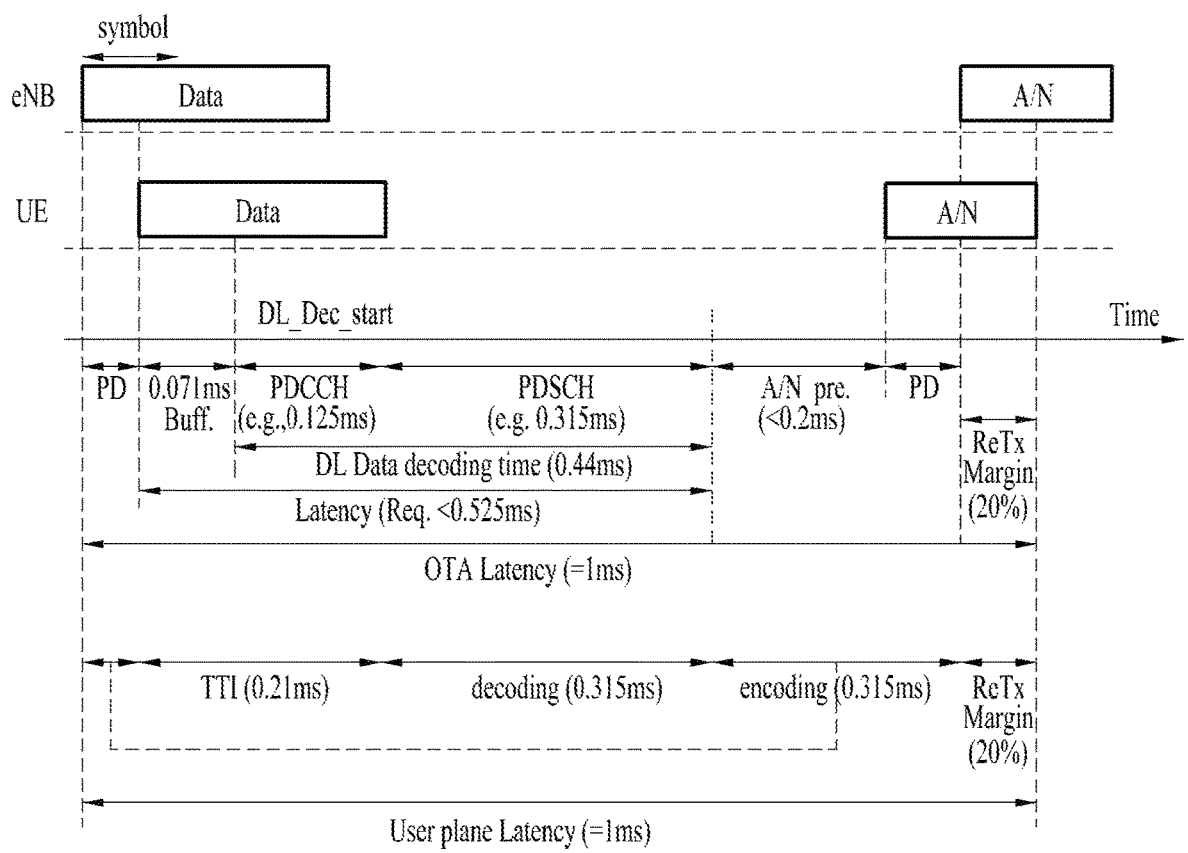
FIG. 5 is a diagram showing reduction in a TTI length according to reduction in user plane latency.

To satisfy the aforementioned reduction in latency, i.e., low latency, it may be required to reduce TTI that is a minimum unit of data transmission to newly design a shortened TTI (sTTI) of 0.5 msec or less. For example, as illustrated in FIG. 5, to shorten user plane (U-plane) latency to a time point when a UE completely transmits ACK/NACK (A/N) from a time point when an eNB begins to transmit data (PDCCH and PDSCH) to 1 msec, a sTTI may be configured in units of about 3 OFDM symbols.

Figure 6:
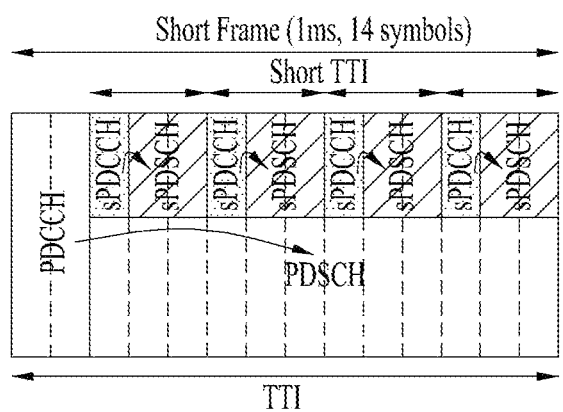
FIG. 6 is a diagram showing an example in which a plurality of short TTIs is set in one subframe.

In a DL environment, a PDCCH (i.e., sPDCCH) for data transmission/scheduling in such a sTTI and a PDSCH (i.e., sPDSCH) for transmission in the sTTI may be transmitted and, for example, as illustrated in FIG. 6, a plurality of sTTIs may be configured using different OFDM symbols in one subframe. Particularly, OFDM symbols included in the sTTI may be configured by excluding OFDM symbols transmitted by legacy control channels. The sPDCCH and the sPDSCH may be transmitted in the sTTI in the form of time division multiplexing (TDM) using different OFDM symbol regions and may be transmitted in the form of frequency division multiplexing (FDM) using different PRB domain/frequency resources.

Figure 7:
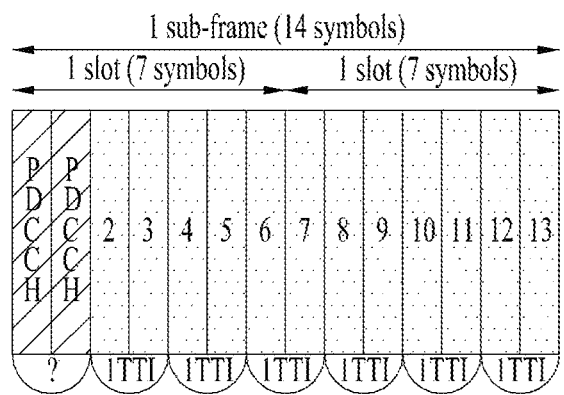
FIG. 7 is a diagram showing a DL subframe structure including a short TTI with a plurality of lengths (symbol numbers)
Figure 7:
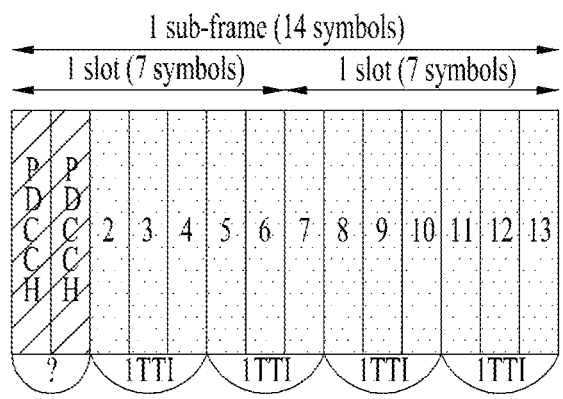
Figure 7:
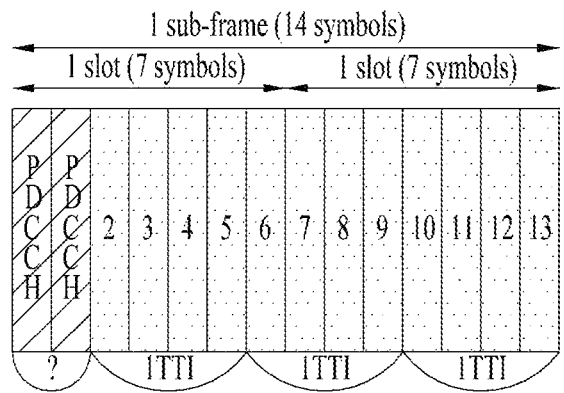
Figure 7:
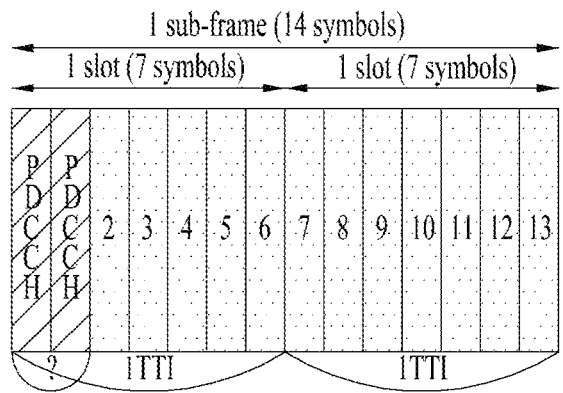

In the specification, the present invention is described below in terms of an LTE/LTE-A system. In an existing LTE/LTE-A, when having a normal CP, a subframe of 1 ms may include 14 OFDM symbols and, when a symbol is configured with a TTI in a shorter unit than 1 ms, a plurality of TTIs may be configured in one subframe. A method of configuring a plurality of TTIs may configure two symbols, three symbols, four symbols, and seven symbols as one TTI, as in an embodiment shown in FIG. 7 below. Although not shown, the case in which one symbol is configured as a TTI may also be configured. When one symbol is one TTI unit, 12 TTIs may be generated on the assumption that a legacy PDCCH is transmitted in two OFDM symbols. Similarly, as shown in FIG. 7A, when two symbols correspond to one TTI unit, 6 TTIs may be generated, as shown in FIG. 7B, when three symbols correspond to one TTI unit, 4 TTIs may be generated and, as shown in FIG. 7C, when four symbols correspond to one TTI unit, 3 TTIs may be generated. Needless to say, in this case, first two OFDM symbols may be assumed to transmit a legacy PDCCH.

As shown in FIG. 7D, when seven symbols are configured with one TTI, one TTI of seven symbol units including a legacy PDCCH and seven subsequent symbols may be configured as one TTI. In this case, in the case of a UE that supports a sTTI, when one TTI includes seven symbols, it may be assumed that puncture or rate-matching is performed on two OFDM symbols positioned at a fore end for transmitting a legacy PDCCH with respect to a TTI (first symbol) positioned at a fore end of one subframe and it may be assumed that corresponding data and/or control information are transmitted in five symbols. On the other hand, it may be assumed that a UE is capable of transmitting data and/or control information all seven symbols without a punctured or rate-matched resource region with respect to a TTI (second slot) positioned at a rear end of one subframe.

Figure 8:
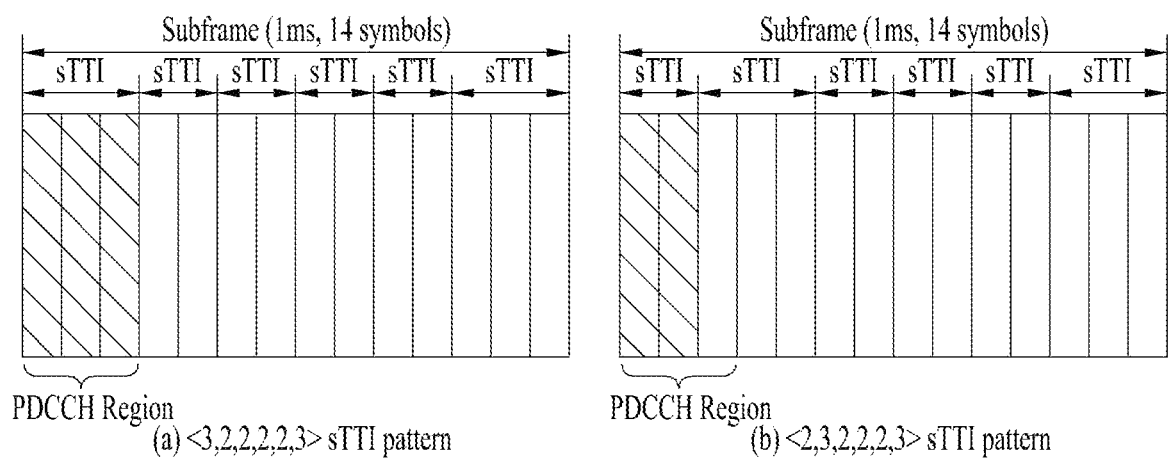
FIG. 8 is a diagram showing a DL subframe structure including a short TTI including two or three symbols.

According to the present invention, a sTTI including two OFDM symbols (hereinafter, "OS") and a sTTI including three OSs may be considered to include sTTI structures that are combined and present in one subframe, as shown in FIG. 8. The sTTI including 2-OS or 3-OS sTTIs may be simply defined as 2-symbol sTTI (i.e., 2-OS sTTI). As shown in FIG. 8A, a sPDCCH may also be transmitted depending on the number of symbols of a PDCCH in a <3,2,2,2,2,3> sTTI pattern. In a <2,3,2,2,2,3> sTTI pattern of FIG. 8B, it may be difficult to transmit an sPDCCH due to a legacy PDCCH region.

UCI Mapping for 3-Symbol TTI

In the case of a terminal configured with a specific TTI length, a particularly small TTI length of a symbol and a matching rule of UCI transmitted in a PUSCH may be differently defined from a conventional case. In the case of a TTI with a small TTI length, it may not be desirable in terms of transmission efficiency to transmit a DM-RS of one symbol every sTTI. Accordingly, when a plurality of consecutive sTTIs are scheduled in one terminal, a dynamic DM-RS insertion method of dynamically signaling whether a DM-RS of every sTTI is transmitted via a network may be considered and, in this case, there is a need to define a UCI mapping rule according to whether a DM-RS is transmitted.

As shown in FIG. 8, a method of configuring one subframe including 14 SC-FDMA symbols based on LTE with {3, 2, 2, 2, 2, 3} or {2, 2, 3, 2, 2, 3} symbols, i.e., a method of configuring one subframe with 6 sTTIs may be considered.

Particularly, a UCI mapping method when a DM-RS symbol is positioned in a center symbol in one TTI (i.e., sTTI) configured with 3-symbol is proposed.

UCI Mapping when DM-RS Symbol is Positioned in Center Symbol in One TTI Configured with 3-Symbol Alt 1: When a DM-RS symbol is positioned in a center symbol in one TTI configured with 3-symbol, a rule may be defined to map Ms in descending order from a highest frequency (or subcarrier) index from one symbol among two data symbols or to map HARQ-ACK in descending order from a highest frequency (or subcarrier) index in the other one symbol. The CQI/PMI may be mapped from a lowest frequency (or subcarrier) index with a lowest index in a time-first frequency-second manner in the same way in a conventional case. An SRS is capable of being mapped to a last symbol and, thus, particularly, a rule may be defined to map HARQ-ACK to another symbol but not a symbol to which the SRS is capable of being mapped.

Alt 2: When a DM-RS symbol is positioned in a center symbol in one TTI configured with 3-symbol, a rule may be defined to map RI in ascending order from a lowest frequency index in one symbol of two data symbols and to map CQI/PMI in ascending order from a lowest frequency index in the other one symbol. A rule may be defined to map HARQ-ACK in descending order from a highest frequency (or subcarrier) index of a symbol to which CQI/PMI is mapped. This is for applying higher priority to RI than CQI/PMI to protect the RI from puncturing during HARQ-ACK mapping. SRS may also be mapped to a last symbol and, thus, particularly, a rule may be defined to map HARQ-ACK and CQI/PMI to another symbol but not a symbol to which SRS is capable of being mapped. Alternatively, considering that RI and CQI/PMI have equivalent priorities, a rule may be defined to perform puncturing via HARQ-ACK in reverse order in a time-first frequency-second manner.

UCI Mapping when DM-RS Symbol is Positioned in First or Last Symbol in One TTI Configured with 3-Symbol Alt 1: UCI mapping may be differently defined according to whether a SRS is transmitted. Hereinafter, {A, B, C} refers to information (RS or data) transmitted in first (A), second (B), and third (C) symbols in a 3-symbol TTI, respectively. For example, in the case of a TTI in which a SRS is not transmitted and which is configured with {RS, data, and data}, HARQ-ACK may be mapped to a symbol closest to a DM-RS in descending order from a highest frequency (or subcarrier) index, RI may be mapped to a symbol second closest to a DM-RS in descending order from a highest frequency (or subcarrier) index, and CQI/PMI may be mapped in ascending order from a lowest frequency (or subcarrier) in a time-first frequency-second manner.

When a SRS is transmitted in one of two data symbols, HARQ-ACK, RI, and CQI/PMI may be mapped to the other one data symbol. Alternatively, when a SRS is transmitted in one of two data symbols, a rule may be defined to transmit only some UCI with high priority to one data symbol and to drop the other UCI. In this case, priority of UCI may be HARQ-ACK>RI>CQI/PMI. According to the above priority, dropping of some UCI with low priority may be applied in the same way to other alternatives or embodiments irrespective of whether a SRS is transmitted and the drop operation may be determined depending on the number of PRBs allocated for a sPUSCH, the length of UL sTTI, and/or UL grant reception-to-UL data transmission timing, etc.

Alt 2: The UCI mapping may be defined irrespective of whether a SRS is transmitted.

Alt 3: When a DM-RS is not present in an SRS transmission TTI, a rule may be defined to drop UCI or applying the same mapping as in the case in which a DM-RS is present.

UCI Mapping in Some REs in Symbol

In the case of a specific TTI length (e.g., 2-symbol TTI), a DM-RS may be mapped to only one symbol in a TTI and, thus, it may not be easy to ensure orthogonality between DM-RSs using an orthogonal cover code (OCC). To compensate for this, a method of mapping a DM-RS corresponding to one PUSCH only to some REs rather than being mapped to all REs in a RB may be considered. For example, when PUSCHs are scheduled in respective different UEs in two TTIs and a DM-RS for modulation of each PUSCH is transmitted in one symbol, a DM-RS for one PUSCH may be mapped to an RE of an even index and a DM-RS for another PUSCH may be mapped to an RE of an odd index. The DM-RS transmission may be referred to as interleaved SC-FDMA (IFDMA).

When IFDMA-based DM-RS transmission is used, a method of transmitting UCI to be mapped to a PUSCH corresponding to a corresponding DM-RS is proposed. For more robust transmission of UCI, a rule may be defined in such a way that UCI is not mapped to a RE of the same frequency (or subcarrier) index as an RE in which a DM-RS is not transmitted and UCI is sequentially mapped only to a RE of the same frequency (or subcarrier) index as an RE in which a DM-RS is transmitted. Particularly, a rule of sequentially mapping UCI only to a RE of the same frequency (or subcarrier) index as an RE in which a DM-RS is transmitted may be applied only to some predefined UCI and, for example, a rule may be defined to be limited only to HARQ-ACK and/or RI mapping (frequency index is first applied to mapping compared with time).

UCI Mapping in the Case of Dynamic DM-RS Insertion

A TTI in which DM-RS and PUSCH data are present together and a TTI in which only PUSCH data is transmitted may be present due to dynamic DM-RS insertion and, accordingly, a UCI mapping rule may be defined as follows.

Alt 1: A rule may be defined in such a way that UCI mapping in a specific TTI is applied in the same way irrespective of whether a DM-RS is present. This may be for minimization of influence on complexity of a UE. For example, a rule may be defined in such a way that HARQ-ACK is always mapped to a second symbol in a TTI irrespective of whether a DM-RS is transmitted, in a TTI in which a DM-RS is positioned or is not positioned in a first symbol in the TTI.

Alt 2: In the case of a TTI in which a DM-RS is not transmitted and only data is present, a rule may be defined in such a way that only specific UCI is transmitted and the other UCI is dropped. For example, a rule may be defined to transmit HARQ-ACK and to drop RI and CQI/PMI with relatively low priority or to transmit HARQ-ACK and RI and to drop CQI/PMI.

Alt 3: According to simultaneous transmission capability of (s)PUSCH and (s)PUCCH and/or whether simultaneous transmission of (s)PUSCH and (s)PUCCH is set, a UCI transmission rule in a TTI in which a DM-RS is not present and only data is transmitted may be differently defined. In detail, even if the simultaneous transmission capability of (s)PUSCH and (s)PUCCH is present and/or the simultaneous transmission setting of (s)PUSCH and (s)PUCCH is transmitted from a network, a rule may be defined in such a way that UCI is transmitted to (s)PUCCH only in the TTI in which a DM-RS is not present and only data is transmitted. Otherwise, a PUSCH may be dropped and UCI may be dropped together or may be transmitted in (s)PUCCH only in the TTI in which a DM-RS is not present and only data is transmitted.

In the case of UL transmission of 2 or 3-symbol, DMRS arrangement may be indicated by UL grant in sTTI #n-x as follows and the corresponding UL grant may schedule a sPUSCH in sTTI #n. Here, x corresponds to a processing time set for a PUCCH group.

TABLE 5

DMRS position pattern indicated by UL grant for sPUSCH scheduling in sTTI n

| sTTI 0 | sTTI 1 | sTTI 2 | sTTI 3 | sTTI 4 | sTTI 5 |
|---|---|---|---|---|---|
| R D D | R D | R D | R D | R D | R D D |
| D D R | D R | D D | D R | D R | |
| | D D | | D D  R | D D | |
| | D D  R | | | D D  R | |

Alt 4: In the case of a TTI in which a DM-RS is not transmitted and only data is present, a terminal may consider that a DMRS symbol is used for modulation in a TTI (or a next TTI or a TTI at a predetermined timing) prior to a corresponding TTI and may determine mapping of specific UCI. That is, as a characteristic example, even if a DMRS used for modulation by an actual eNB is after a corresponding TTI, when only data is present in a TTI to which UCI is to be mapped irrespective of this, a rule may be defined to consider that the DMRS is present in a TTI prior to a corresponding TTI and to map UCI.

For example, in the case of sTTI #1={D D}, a DMRS may be considered to be present in sTTI #0, HARQ-ACK may be mapped to a first symbol of sTTI #1, and RI and/or CQI/PMI may be mapped to a second symbol. More generally, a rule may be defined to map UCI with higher priority than a symbol that is as closer as possible to a TTI in which a DMRS is considered to be present.

Alt 5: When a DMRS position is indicated through UL grant DCI, a rule may be defined to differently determine a UCI mapping rule according to corresponding DMRS position signaling and/or a sTTI index.

For example, in the case of {D D}, a DMRS may be considered to be present prior to a corresponding TTI and UCI with as high priority as possible may be mapped to a first symbol. In more detail, HARQ-ACK may be mapped to a first symbol and RI and/or CQI/PMI may be mapped to a second symbol. On the other hand, in the case of {D D R}, a DMRS may be considered to be present after a corresponding TTI and UCI with as high as priority may be mapped to a second symbol. In more detail, RI and/or CQI/PMI may be mapped to a first symbol and HARQ-ACK may be mapped to a second symbol.

For another example, in the case of {D D} of sTTI #1 and sTTI #2, a DMRS may be considered to be present prior to a corresponding TTI and UCI with as high priority as possible may be mapped to a first symbol and, on the other hand, in the case of {D D} of sTTI #4, a DMRS may be considered to be present after a corresponding TTI and UCI with as high priority as possible may be mapped to a second symbol.

Processing Method when a Plurality of UL Channels Overlap with Each Other

When a plurality of UL channel transmission timings with different numerologies, TTI lengths, and/or processing time periods overlap with each other on time, all or some of channels (first channel) with specific numerology, TTI length, and/or processing time period may be dropped/stopped and only the other channels (second channel) may be transmitted. More particularly, when transmission timing of a first channel with as long a TTI length as possible and transmission timing of a plurality of second channels (group) with a shorter TTI length than the first channel overlap with each other, a method of transmitting UCI of the first channel to all or some of the second channels is proposed. For example, the aforementioned case may include the case in which transmission timing of one 1 ms TTI PUSCH (or PUCCH) and transmission timing of a plurality of 2-symbol TTIs PUSCH (sPUCCH or combination of sPUSCH and sPUCCH) overlap with each other in a specific frame.

Alt 1: A rule may be defined to determine a piggybacked channel among a plurality of second channels according to a UCI type of a first channel. Particularly, a rule may be defined to piggyback UCI to a second channel with high priority of a piggybacked channel among a plurality of second channels in order from highest priority of a UCI type of the first channel. For example, UCI (e.g., HARQ-ACK) with as high priority as possible of the first channel may be piggybacked to a channel with high priority among second channels. In this case, the priority of the second channels may be defined in an order of sPUSCH with self-contained DM-RS>sPUCCH>sPUSCH without self-contained DM- RS, or sPUSCH with self-contained DM-RS>sPUSCH without self-contained DM-RS>sPUCCH.

More generally, a rule may be defined to preferentially piggyback UCI of a first channel to a second channel with high priority of a piggybacked channel. In this case, a rule may be defined to piggyback entire UCI of the first channel to the second channel without being dropped or to piggyback only some UCI with high priority from the UCI of the first channel to a plurality of second channels. In addition, a rule may be defined to piggyback all or some of UCI of the first channel to only some channels with high priority among a plurality of second channels. Priority according to a UCI type of the first channel may be defined according to HARQ-ACK>RI>CQI/PMI.

Alt 2: As another method, a rule may be defined to piggyback UCI in a transmission time sequence of a piggybacked channel among a plurality of second channels in order from highest priority of a UCI type of the first channel. For example, a rule may be defined to preferentially piggyback HARQ-ACK of the first channel to a channel of the plurality of second channels, which first overlaps with the first channel, and to sequentially piggyback RI and/or CQI/PMI of the first channel to a channel of the plurality of second channels, which secondary overlaps with the first channel.

Alt 3: A rule may be defined to determine a UCI type of a piggybacked first channel depending on a TTI length of a plurality of second channels that overlap with the first channel. For example, when the plurality of second channels that overlap with the first channel have different TTI lengths, RI and/or CQI/PMI of the first channel may be piggybacked to a sTTI UL channel with as large TTI length as possible of the second channel and HARQ-ACK of the first channel may be piggybacked to a sTTI UL channel with as smaller TTI length as possible. That is, a UCI type with high priority may be piggybacked to a channel with shorter latency than a UCI type with low priority.

Alt 4: Whether UCI of a first channel is repeatedly piggybacked to a plurality of second channels may be predetermined/defined or may be reset via a high layer signal depending on a UCI type of the first channel. For example, when HARQ-ACK of the first channel overlaps with the plurality of second channels, the HARQ-ACK of the first channel may be piggybacked and repeatedly transmitted to all (or some) of the second channels. Particularly, a rule may be defined to piggyback UCI of the first channel only on a sTTI in which a DM-RS of a plurality of second channels is self-contained. Alternatively, on the other hand, a rule may be defined to piggyback UCI of the first channel only on a sTTI in which a DM-RS is not present in a corresponding sTTI. This is because a sTTI in which a DM-RS is self-contained has high accuracy of channel estimation to enable UCI transmission with higher reliability but a coding rate of the corresponding sTTI is higher than a sTTI in which a DM-RS is not present in a corresponding sTTI, which have a tradeoff relation and, accordingly, a rule may be predefined to apply one of the two rules and a terminal may perform a piggyback operation according to the rule. Alternatively, a network may set one of the two rules via a high layer (or a physical layer) signal.

Alt 5: When there is a plurality of sTTIs in which a DM-RS is self-contained in a second channel, a rule may be defined to preferentially piggyback UCI of a first channel to the second channel in which a sTTI is first transmitted among the plurality of sTTIs.

Alt 6: When there is a plurality of sTTIs in which an DM-RS is self-contained in a second channel, a rule may be defined to preferentially piggyback UCI of a first channel to the second channel having a lowest cell index (or a highest cell index or a cell index with high predefined priority or indicated by a high/physical layer signal). Alternatively, the UCI of the first channel may be piggybacked to a plurality of second channels selected in ascending order from a lowest cell index (or a plurality of second channels selected in descending order from a highest cell index or a plurality of second channels with high predefined priority or indicated by a high/physical layer signal) and, in this case, the number of the piggybacked second channels may be predefined or may be indicated by a high layer signal or a physical layer signal.

Alt 7: When transmission timings of a first channel and a plurality of second channels (group) overlap with each other, a rule may be defined in such a way that the second channel that does not include UCI has higher priority than a channel including UCI. For example, the priority of the second channel may be defined in order of sPUSCH without UCI>sPUSCH with UCI>sPUCCH or sPUSCH without UCI>sPUCCH>sPUSCH with UCI. This is to minimize piggyback of UCI of the first channel to the second channel including UCI and, this is because, when other UCI is piggybacked to a channel including UCI, performance may be more degraded than in the case in which UCI is piggybacked to a channel that does not include UCI.

According to a combination of some (or all) of the above Alts, an operation of a terminal may be defined when UCI of the first channel is piggybacked to all or some of the plurality of second channels.

UCI Transmission Bundling in Case of Collision Between PUCCH/PUSCH & sPUCCH/sPUSCH When a plurality of UL channel transmission timings with different numerologies, TTI lengths, and/or processing time periods overlap with each other on time, all or some of channels (first channel) with specific numerology, TTI length, and/or processing time period may be dropped/stopped and only the other channels (second channel) may be transmitted. More particularly, when transmission timing of a first channel with as long a TTI length as possible and transmission timing of (s)PUCCH with a shorter TTI length than the first channel overlap with each other, a detailed method of transmitting UCI of the first channel to (s)PUCCH or (s)PUSCH is proposed.

With regard to a format in which a payload size of (s)PUCCH is limited to 2 bits or less, total bit number of UCI (e.g., HARQ-ACK) corresponding to the first channel and (s)PUCCH is greater than 2 bits, a final payload size may be limited to be 2 bits or less through bundling. Alternatively, to control performance degradation of sPUSCH due to UCI transmission of the first channel, the UCI of the first channel may be limited to a predetermined bit number or less. The bundling operation may include spatial bundling, bundling with different numerologies, TTI lengths, and/or processing time periods, and/or bundling between carriers of PDSCH HARQ-ACK.

When a terminal misses DCI with respect to the first channel, ambiguity may be caused with respect to whether (s)PUCCH/(s)PUSCH transmitted from the terminal transmits bundled HARQ-ACK information or includes only HARQ-ACK on sPDSCH without bundling in terms of an eNB. Accordingly, the following methods may be considered to prevent this situation.

Alt 1: Whether UCI of the first channel is bundled with DCI of the second channel may be obviously indicated. According to the corresponding indication, a terminal may accurately recognize whether other DCI except for the second channel is missed. Here, the other DCI may include DCI for scheduling a data channel corresponding to HARQ-ACK of the first channel or DCI for scheduling the first channel. Alternatively, when UCI of the first channel is transmitted by the second channel, whether UCI of the first channel is bundled may be set through a high layer signal. The DCI signaling or setting using the high layer signal may be separately applied in different ways depending on a specific sTTI length of the second channel, numerology of the second channel, and/or a UCI payload size of the first channel.

Alt 2: When bundling is performed, a resource to which (s)PUCCH/(s)PUSCH is to be transmitted may be separately set. In more detail, a (s)PUCCH/(s)PUSCH resource when bundling is performed may be separately set through a high layer signal. Alternatively, when bundling is performed on a (s)PUCCH/(s)PUSCH resource indicated via dynamic signaling, offset indicating a resource to be used may be set/indicated through a high layer signal (or DCI) or may be defined as a predetermined value.

Format Adaptation

With regard to a format in which a payload size of (s)PUCCH is limited to X bits or less, when a total bit number of UCI (e.g., HARQ-ACK) corresponding to the first channel and (s)PUCCH is greater than X bits, a rule may be defined to transmit UCI corresponding to the first channel and (s)PUCCH to (s)PUCCH that supports (X+1) bits or more. When a (s)PUCCH resource is indicated in the form of an ACK/NACK resource indicator (ARI) of DCI, some of states of an ARI field may be operatively associated with a source of a (s)PUCCH format that supports 2 bits or less and the other some may be operatively associated with a source of a (s)PUCCH format that supports 3 bits or more. In this case, compared with the case in which a resource of one (s)PUCCH format is operatively associated with all of the states indicated by the ARI field, flexibility of resource setting with respect to each (s)PUCCH format may be reduced to a certain degree.

As another method, a separate resource for each (s)PUCCH format may be operatively associated with all (or some) of the states indicated by the ARI field. For example, when the ARI field is 2 bits, four resources for a (s)PUCCH format that supports two bits or less, and four resources for a (s)PUCCH format that supports three bits or more may be set to the UE. In this case, a state indicated by the ARI field may include a state in which only the second channel is present without scheduling of the first channel and a state in which the first channel and the second channel overlap with each other and, accordingly, a rule may be defined to interpret the former case as one of resources for a (s)PUCCH format that supports two bits or less and to interpret to latter case as one of resources for a (s)PUCCH format that supports three bits or more, depending on the state.

When transmission timings of the first channel with as long a TTI length as possible and (s)PUCCH with a shorter TTI length than the first channel overlap with each other, a method used to transmit UCI among bundling and format adaption may be set to the terminal through a high layer signal. The terminal may perform a UCI transmission operation using one of bundling and format adaption according to setting in the above case.

Carrier Bundling

When a plurality of UL channel transmission timings with different numerologies, TTI lengths, and/or processing time periods overlap with each other on time, all or some of channels (first channel) with specific numerology, TTI length, and/or processing time period may be dropped/stopped and only the other channels (second channel) may be transmitted.

More particularly, when transmission timing of a first channel with as long a TTI length as possible and transmission timing of (s)PUCCH with a shorter TTI length than the first channel overlap with each other, if the UCI of the first channel is transmitted to the second channel and the terminal misses the DCI of the first channel, ambiguity may be caused with respect to whether (s)PUCCH/(s)PUSCH transmitted from the terminal transmits HARQ-ACK information of sPDSCH and HARQ-ACK information of PDSCH together or includes only HARQ-ACK of sPDSCH in terms of a UE. To prevent this, a method of always including a HARQ-ACK payload corresponding to HARQ-ACK of PDSCH during transmission of HARQ-ACK of sPDSCH may be considered. However, this method is disadvantageous in that a payload of sPUCCH is unnecessarily increased, a UL-SCH portion of sPUSCH is unnecessarily punctured, a HARQ-ACK bit is transmitted. To alleviate this, a method of reducing a payload size of PDSCH HARQ-ACK information of the first channel on one or more carriers (or cells) to be delivered in (s)PUCCH/(s)PUSCH through carrier bundling and transmitting the information may be considered.

A method of determining a HARQ-ACK payload supported by LTE may be largely classified into two methods. A first method is a semi-static HARQ-ACK codebook size determination method of determining an HARQ-ACK payload depending on the number of predetermined CCs and the maximum number of codewords determined by a DL transmission mode (TM) set to each CC. A second method is a dynamic HARQ-ACK codebook size determination method of indicating the size by a downlink assignment index (DAI) in DL assignment DCI. In the case of the dynamic HARQ-ACK codebook size determination, the aforementioned ambiguity of an HARQ-ACK payload in terms of an eNB may not be generated as long as entire DCI is not missed. In addition, in the case of semi-static HARQ-ACK codebook size determination, excessive bit reservation or delay may be caused when a HARQ-ACK payload corresponding to HARQ-ACK of PDSCH is always included in the second channel.

Accordingly, when HARQ-ACK of the first channel is transmitted to the second channel, a rule may be defined to apply bundling between carriers of PDSCH HARQ-ACK of the first channel only when semi-static HARQ-ACK codebook size determination is set for the first channel. When PDSCH HARQ-ACK of the first channel is transmitted to the second channel, a rule may be applied to apply bundling between carriers for PDSCH HARQ-ACK of the first channel only when the number of predetermined (or activated) CCs is equal to or greater than a predetermined number.

UCI Mapping onto Subslot sPUSCH

When UCI is piggybacked to a subslot sPUSCH, performance of UCI may be influenced by a relatively short TTI length and a power transient period caused by another TTI. The present invention proposes a UCI mapping method for minimizing the influence.

Option 1: A UCI mapping method may be differently defined depending on a position of DMRS in a TTI and/or a TTI boundary. Particularly, like {R D}, when a DMRS is positioned in a front symbol in a TTI, a coded symbol may be mapped to a data symbol while a frequency (or subcarrier) index is increased from a minimum frequency (or subcarrier) index in such a way that HARQ-ACK with highest priority is farthest from a TTI rear boundary. On the other hand, like {D R}, when a DMRS is positioned in a rear symbol in a TTI, a coded symbol may be mapped to a data symbol while a frequency (or subcarrier) index is reduced from a maximum frequency (or subcarrier) index in such a way that the HARQ-ACK is farthest from a TTI front boundary.

Option 2: In the case of 2-symbol sTTI without a DMRS in a TTI (i.e., {D D}), a coded symbol may be mapped while a frequency (or subcarrier) index is reduced from a maximum frequency (or subcarrier) index in such a way that the HARQ-ACK is farthest from a TTI front boundary in a first symbol. On the other hand, in the case of RI and/or CQI/PMI, a coded symbol may be mapped while a frequency (or subcarrier) index is increased from a minimum frequency (or subcarrier) index in such a way that the HARQ-ACK is farthest from a TTI rear boundary in a second symbol. More generally, a rule may be defined to map each UCI in descending order/ascending order of a frequency domain and to map each UCI to different time domain symbols by excluding a lower frequency (or subcarrier) index of a TTI front boundary influenced by a power transient period and a higher frequency (or subcarrier) index of a TTI rear boundary.

Option 3: With respect to specific UCI, a rule may be predefined to preset a plurality of beta (β) offsets and to apply a value among the beta offsets depending on a TTI length, a DMRS pattern, a modulation and coding scheme (MCS), and/or a UCI payload. The beta (β) offset may be a parameter used to determine the number of coded (modulated) symbols for HARQ-ACK, a rank indicator, or CRI and may be a value dependent upon the number of transmission codewords for corresponding (s)PUSCH.

When only one transfer block is transmitted in (s)PUSCH for delivering HARQ-ACK bit(s), rank indicator bits, or CRI bits, the number of coded (modulated) symbols (i.e., the number of resource elements (REs)) Q' may be obtained as follows.

$$Q' = \min\left(\left\lceil \frac{O \cdot M_{sc}^{PUSCH-initial} \cdot N_{symb}^{PUSCH-initial} \cdot \beta_{offset}^{PUSCH}}{\sum_{r=0}^{C-1} K_r} \right\rceil, 4 \cdot M_{sc}^{PUSCH}\right)$$ [Equation 1]

In Equation 1 above, $\beta_{offset}^{PUSCH}$ is beta offset.

Here, O is a UCI payload size (i.e., the number of HARQ-ACK bits, rank indicator bits, or CRI bits) distributed to a PUSCH resource, $M_{sc}^{PUSCH}$ is the number of frequency-axis subcarriers of a PUSCH resource, $N_{symb}^{PUSCH-initial}$ is the number of SC-FDMA symbols to which a PUSCH resource is allocated, Kr is a bit number of an $r^{th}$ code block, and ⌈ ⌉ is a ceiling sign.

For example, when two beta offset values are preset with respect to specific UCI and 2-symbol sTTI and/or a DMRS pattern correspond to {R D} and {D R}, a rule may be defined to apply a higher beta offset value from the two values is applied and, on the other hand, when 3-symbol sTTI and/or DMRS pattern correspond to {R D D} and {D D R}, a rule may be defined to apply a lower beta offset value from the two values.

Option 4: With respect to specific UCI, a rule may be defined to set independently different beta offset values for respective TTIs through a high layer signal or to indicate the beta offset values through a physical layer signal. Particularly, a rule may be defined to independently differently set/indicate beta offsets to be applied to 2-OS TTI and 3-OS TTI of sub slot PUSCH.

1 ms TTI UCI Piggyback onto sTTI (Simultaneous Transmission)

When a plurality of UL channel transmission timings with different numerologies, TTI lengths, and/or processing time periods overlap with each other on time, all or some of channels (first channel) with specific numerology, TTI length, and/or processing time period may be dropped/stopped and only the other channels (second channel) may be transmitted. More particularly, when transmission timing of a first channel with as long a TTI length as possible and transmission timing of (s)PUCCH with a shorter TTI length than the first channel overlap with each other, if the UCI of the first channel is transmitted to the second channel and the terminal misses the DCI of the first channel, ambiguity may be caused with respect to whether (s)PUCCH/(s)PUSCH transmitted from the terminal transmits HARQ-ACK information of sPDSCH and HARQ-ACK information of PDSCH together or includes only HARQ-ACK of sPDSCH in terms of a terminal. To prevent this, a method of always including a HARQ-ACK payload corresponding to HARQ-ACK of PDSCH during transmission of HARQ-ACK of sPDSCH may be considered.

During transmission of the second channel, when a payload of UCI of the first channel is considered as described above, a channel to which the corresponding UCI payload of the first channel is actually applied may be determined as follows. More particularly, when simultaneous transmission of PUSCH/PUCCH is set or possible with respect to the second channel with a shorter TTI length (with a greater subcarrier spacing and/or a shorter processing time) than the first channel, a rule may be defined to transmit original UCI corresponding to TTI length/numerology/processing time of the second channel to PUCCH and to transmit UCI of the first channel corresponding to different TTI length/numerology/processing time from the former case to PUSCH. This is because channel transmission performance is less influenced when the UCI of the first channel is piggybacked to PUSCH than PUCCH.

As another method, a channel type of the second channel in which a UCI payload of the first channel is actually transmitted may be set through a high layer signal or may be indicated through a physical layer signal. Here, the physical layer signal may include DCI for scheduling the second channel.

When both UCIs corresponding to TTI lengths/numerologies/processing times of the first and second channels are transmitted to PUSCH of the second channel, a rule may be defined to map UCI of the first channel and, then, to map UCI of the second channel. This is to minimize adverse influence on UCI corresponding to TTI length/numerology/processing time by mapping UCI corresponding to the TTI length/numerology/processing time of the first channel with lower priority of the first channel and the second channel to as closer a side to a symbol boundary as possible because influence by a power transient period is high at a symbol boundary in terms of a frequency domain.

UCI Transmission in Case of Collision Between PUCCH/PUSCH & sPUSCH

When a plurality of UL channel transmission timings with different numerologies, TTI lengths, and/or processing time periods overlap with each other on time, all or some of channels (first channel) with specific numerology, TTI length, and/or processing time period may be dropped/stopped and only the other channels (second channel) may be transmitted. More particularly, when transmission timing of a first channel with as long a TTI length as possible and transmission timing of (s)PUCCH with a shorter TTI length than the first channel overlap with each other, a detailed method of transmitting UCI of the first channel to (s)PUSCH is proposed. The proposal may also be applied to a more general situation in which UCI is included and transmitted to the second channel with a TTI length and/or numerology except for a reference/default TTI length and/or numerology without the above overlap. For convenience of description, as long a TTI as possible is referred to as a first TTI length and the shorter TTI length is referred to as a second TTI length.

In Equation 1 above, $4 \cdot M_{sc}^{PUSCH}$ is a value for limiting a maximum value of Q' and the number of REs corresponding to RBs of scheduled PUSCH and four SC-FDMA symbols and, in this regard, a TTI length is short compared with an conventional case in the case of sPUSCH and, thus, when the above equation is applied to sPUSCH without change, all of the REs may be inevitably used in all UCI. Accordingly, the value needs to be reduced.

Particularly, value for limiting a maximum value of coded symbols to which sHARQ-ACK of sPUSCH (corresponding to sPDSCH) is to be mapped may be determined as a separate value different from in the conventional case. The value may be set through a high layer signal or may be determined according to a predefined rule. In generally, the value for limiting a maximum value of the number of coded symbols to which sHARQ-ACK of sPUSCH (corresponding to sPDSCH) is to be mapped may be determined by a combination of (1) "a value set through a high layer signal or a predefined value (e.g., the number of SC-FDMA symbols in which UCI is to be mapped to sPUSCH)" and (2) "a sPUSCH scheduling bandwidth (the number of subcarriers) or the subset of a scheduling bandwidth". For example, the value may be determined by the product of the number of SC-FDMA symbols in which specific UCI (e.g., HARQ-ACK) is mapped to sPUSCH and the number of subcarriers corresponding to sPUSCH scheduling.

A rule may be defined to perform separate coding on UCI corresponding to a first TTI length and UCI corresponding to a second TTI length and to transmit the UCI to sPUSCH and, in this regard, resources to which UCI of a corresponding TTI length is to be mapped for each TTI length may be pre-differentiated in a frequency axis (and/or in a time axis) and the value for limiting a maximum value of Q' may be determined for each TTI length in consideration of a maximum number of REs to which UCI is actually to be mapped in a corresponding resource region. For example, when a rule is defined to map HARQ-ACK only to one symbol with respect to 2-symbol sPUSCH, to map UCI with a first TTI length to a half of a scheduled RB, and to map UCI with a second TTI length to the other half, if 50 RBs are scheduled with respect to sPUSCH, the value for limiting the maximum value of Q' may be set according to 25 RB*12 subcarriers*1 symbol=300 (REs).

As another example, the value may be set in the form of offset compared with the value $4 \cdot M_{sc}^{PUSCH}$ or a scaling factor through a high layer signal.

More particularly, the value may be different for each TTI length. The rule may be also applied in a similar way to determination of the number of coded symbols to which RI is to be mapped.

UE Capability Regarding sPUCCH Format

PUCCH of sTTI may be considered and, particularly, PUCCH format (PF) 3-based sPUCCH and PF 4-based sPUCCH may be considered. The sPUCCH formats may be formed based on existing 1 ms PUCCH format but an operating range may be different from an existing PUCCH format according to whether intra-TTI hopping as well as a TTI including a smaller symbol is applied. Accordingly, a rule may be defined to provide capability signaling to a network by a terminal with respect to whether PF3-based sPUCCH and/or PF4-based sPUCCH are supported separately from whether existing PF3/PF4 is supported.

Alternatively, a terminal that is capable of supports existing PUCCH format 4 may be considered to support PF3-based sPUCCH and/or PF4-based sPUCCH. Alternatively, a terminal with capability of existing PUCCH format x may also be considered to support PF x-based sPUCCH.

Alternatively, whether PF3-based sPUCCH and PF4-based sPUCCH are supported may be defined as one capability and may be reported to a network. The proposals exemplify a specific PUCCH format and PFx-based sPUCCH but may be generally and extensively applied to various other formats.

The aforementioned proposed methods may be included in one of embodiments of the present invention and, thus, may be considered as a type of proposed methods. The aforementioned proposed methods may be independently embodied but may be embodied in a combination (or union) of some of the proposed methods. A rule may be defined to indicate information on whether the proposed methods are applied (or information on the rule of the proposed methods) to a terminal through a predefined signal (e.g., a physical layer signal or a high layer signal).

Figure 9:
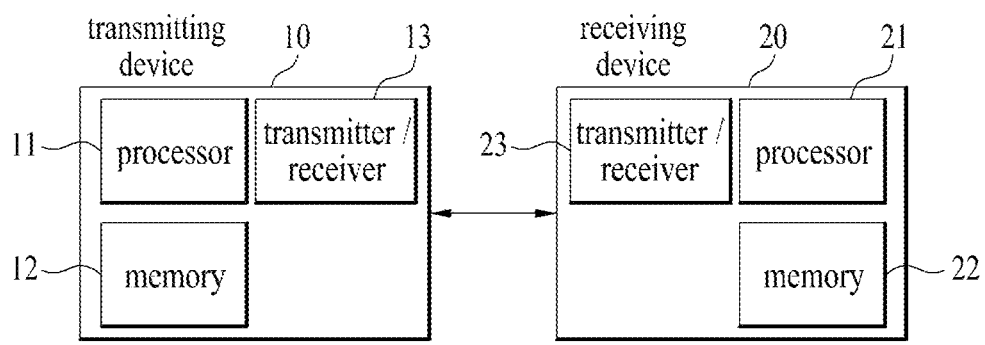
FIG. 9 is a block diagram showing an apparatus for embodying embodiment(s) of the present invention.

FIG. 9 is a block diagram illustrating a transmitting device 10 and a receiving device 20 configured to implement embodiments of the present invention. Each of the transmitting device 10 and receiving device 20 includes a transmitter/receiver 13, 23 capable of transmitting or receiving a radio signal that carries information and/or data, a signal, a message, etc., a memory 12, 22 configured to store various kinds of information related to communication with a wireless communication system, and a processor 11, 21 operatively connected to elements such as the transmitter/receiver 13, 23 and the memory 12, 22 to control the memory 12, 22 and/or the transmitter/receiver 13, 23 to allow the device to implement at least one of the embodiments of the present invention described above.

The memory 12, 22 may store a program for processing and controlling the processor 11, 21, and temporarily store input/output information. The memory 12, 22 may also be utilized as a buffer. The processor 11, 21 controls overall operations of various modules in the transmitting device or the receiving device. Particularly, the processor 11, 21 may perform various control functions for implementation of the present invention. The processors 11 and 21 may be referred to as controllers, microcontrollers, microprocessors, microcomputers, or the like. The processors 11 and 21 may be achieved by hardware, firmware, software, or a combination thereof. In a hardware configuration for an embodiment of the present invention, the processor 11, 21 may be provided with application specific integrated circuits (ASICs) or digital signal processors (DSPs), digital signal processing devices (DSPDs), programmable logic devices (PLDs), and field programmable gate arrays (FPGAs) that are configured to implement the present invention. In the case which the present invention is implemented using firmware or software, the firmware or software may be provided with a module, a procedure, a function, or the like which performs the functions or operations of the present invention. The firmware or software configured to implement the present invention may be provided in the processor 11, 21 or stored in the memory 12, 22 to be driven by the processor 11, 21.

The processor 11 of the transmitter 10 performs predetermined coding and modulation of a signal and/or data scheduled by the processor 11 or a scheduler connected to the processor 11, and then transmits a signal and/or data to the transmitter/receiver 13. For example, the processor 11 converts a data sequence to be transmitted into K layers through demultiplexing and channel coding, scrambling, and modulation. The coded data sequence is referred to as a codeword, and is equivalent to a transport block which is a data block provided by the MAC layer. One transport block is coded as one codeword, and each codeword is transmitted to the receiving device in the form of one or more layers. To perform frequency-up transformation, the transmitter/receiver 13 may include an oscillator. The transmitter/receiver 13 may include Nt transmit antennas (wherein Nt is a positive integer greater than or equal to 1).

The signal processing procedure in the receiving device 20 is configured as a reverse procedure of the signal processing procedure in the transmitting device 10. The transmitter/receiver 23 of the receiving device 20 receives a radio signal transmitted from the transmitting device 10 under control of the processor 21. The transmitter/receiver 23 may include Nr receive antennas, and retrieves baseband signals by frequency down-converting the signals received through the receive antennas. The transmitter/receiver 23 may include an oscillator to perform frequency down-converting. The processor 21 may perform decoding and demodulation on the radio signal received through the receive antennas, thereby retrieving data that the transmitting device 10 has originally intended to transmit.

The transmitter/receiver 13, 23 includes one or more antennas. According to an embodiment of the present invention, the antennas function to transmit signals processed by the transmitter/receiver 13, 23 are to receive radio signals and deliver the same to the transmitter/receiver 13, 23. The antennas are also called antenna ports. Each antenna may correspond to one physical antenna or be configured by a combination of two or more physical antenna elements. A signal transmitted through each antenna cannot be decomposed by the receiving device 20 anymore. A reference signal (RS) transmitted in accordance with a corresponding antenna defines an antenna from the perspective of the receiving device 20, enables the receiving device 20 to perform channel estimation on the antenna irrespective of whether the channel is a single radio channel from one physical antenna or a composite channel from a plurality of physical antenna elements including the antenna. That is, an antenna is defined such that a channel for delivering a symbol on the antenna is derived from a channel for delivering another symbol on the same antenna. An transmitter/receiver supporting the Multiple-Input Multiple-Output (MIMO) for transmitting and receiving data using a plurality of antennas may be connected to two or more antennas.

In embodiments of the present invention, the UE or the terminal operates as the transmitting device 10 on uplink, and operates as the receiving device 20 on downlink. In embodiments of the present invention, the eNB or the base station operates as the receiving device 20 on uplink, and operates as the transmitting device 10 on downlink.

The transmitting device and/or receiving device may be implemented by one or more embodiments of the present invention among the embodiments described above.

One of these embodiments proposes a terminal for supporting a plurality of transmission time interval (TTI) lengths, a plurality of subcarriers, or a plurality of processing times in a wireless communication system. The terminal may include a receiver and transmitter and a processor for controlling the transmitter and the receiver and, in this case, the processor may map uplink control information to a wireless resource in a TTI including two or three symbols, the uplink control information may include hybrid automatic retransmission request-acknowledgement/non-acknowledgement (HARQ-ACK), a rank indicator (RI), a channel quality indicator (CQI) or a precoding matrix indicator (PMI) and, when the uplink control information is transmitted to an eNB and there is no symbol in which a DMRS is mapped in the TTI, the HARQ-ACK is mapped to a first symbol in the TTI in descending order from a resource element (RE) of a highest frequency index and the RI may be mapped to the other symbol in the TTI in descending order from an RE of a highest frequency index.

Additionally or alternatively, when a demodulation reference signal (DMRS) is positioned in a first symbol in the TTI and a sounding reference signal (SRS) is positioned in a last symbol in the TTI, the HARQ-ACK, the RI, and the CQI/PMI may be mapped to a center symbol in the TTI.

Additionally or alternatively, a maximum number of coded symbols to which the uplink control information is to be mapped may be limited by the product of the number of symbols to which the uplink control information is mapped and the number of subcarriers corresponding to a channel to which the uplink control information is to be transmitted.

The number of symbols to which the uplink control information is mapped may be changed for each TTI length. Accordingly, a maximum number of coded symbols to which the uplink control information is to be mapped may be differently determined for each TTI length.

Additionally or alternatively, a channel to which the uplink control information is to be transmitted may be an uplink data channel with a TTI having a shorter length than 1 ms.

Additionally or alternatively, the TTI includes two symbols and a DMRS is positioned in one of the two symbols, a DMRS for modulation of one uplink data channel may be mapped only to some of all RBs.

Additionally or alternatively, the uplink control information may be mapped only to a RE with the same frequency index as an RE to which the DMRS is mapped in the other of the two symbols and uplink control information mapped only to an RE with the same frequency index as the RE to which the DMRS is mapped may include the HARQ-ACK or the RI.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention defined in the appended claims. Thus, the present invention is not intended to be limited to the embodiments described herein, but is intended to have the widest scope consistent with the principles and novel features disclosed herein.

INDUSTRIAL APPLICABILITY

The present invention can be used for such a wireless communication device as a terminal, a relay, a base station, and the like.

The invention claimed is:

1. A method of transmitting uplink (UL) control information by a terminal in a wireless communication system, the method comprising:

mapping, in both a time domain and a frequency domain, the UL control information to a radio resource in a transmission time interval (TTI), the UL control information comprising (i) hybrid automatic retransmission request-acknowledgement/non-acknowledgement (HARQ-ACK), and (ii) a rank indicator (RI); and transmitting the UL control information to a base station (BS), using the radio resource to which the UL control information is mapped in the TTI, wherein mapping, in both the time domain and the frequency domain, the UL control information to the radio resource in the TTI comprises:

based on (i) the TTI having a time duration of two symbols, (ii) a demodulation reference signal (DMRS) not being mapped to any of the two symbols in the TTI, and (iii) the DMRS being mapped to another TTI that is subsequent in time to the TTI:

mapping the HARQ-ACK to an initial symbol among the two symbols in the TTI, in descending order of frequency from a resource element (RE) of a highest frequency index for the initial symbol; and mapping the RI to a last symbol among the two symbols in the TTI, in descending order of frequency from an RE of a highest frequency index for the last symbol.

2. The method according to claim 1, wherein mapping, in both the time domain and the frequency domain, the UL control information to the radio resource in the TTI further comprises:

based on (i) the TTI having a time duration of three symbols, and (ii) the DMRS being mapped to an initial symbol among the three symbols in the TTI:

mapping both the HARQ-ACK and the RI to a middle symbol among the three symbols in the TTI, and mapping a sounding reference signal (SRS) to a last symbol among the three symbols in the TTI, wherein the HARQ-ACK and the RI are mapped to different frequencies for the middle symbol.

3. The method according to claim 1, wherein the terminal is configured to support a plurality of TTI time durations and a plurality of subcarrier spacing, and wherein a maximum number of coded symbols to which the UL control information is to be mapped is limited by a product of (i) a number of symbols to which the UL control information is mapped and (ii) a number of subcarriers corresponding to a channel to which the UL control information is to be transmitted.

4. The method according to claim 3, wherein the number of symbols to which the UL control information is mapped is different for each of the plurality of TTI time durations.

5. The method according to claim 1, wherein transmitting the UL control information to the BS, using the radio resource to which the UL control information is mapped in the TTI, comprises:

transmitting the UL control information in an UL data channel with the TTI having a duration less than 1 ms.

6. The method according to claim 1, wherein, based on (i) the TTI having a time duration of two symbols, and (ii) the DMRS being mapped to one of the two symbols in the TTI:

the DMRS is mapped to the one of the two symbols using fewer than all resource blocks (RBs) in the frequency domain.

7. The method according to claim 6, wherein mapping, in both the time domain and the frequency domain, the UL control information to the radio resource in the TTI further comprises:

based on (i) the TTI having a time duration of two symbols, and (ii) the DMRS being mapped to one of the two symbols using fewer than all RBs in the frequency domain:

mapping the HARQ-ACK or the RI to the other of the two symbols using only a resource element (RE) having a same frequency index as an RE to which the DMRS is mapped in the frequency domain.

8. A terminal configured to transmit uplink (UL) control information in a wireless communication system, the terminal comprising:

a receiver and a transmitter;

at least one processor; and at least one computer memory operably connectable to the at least one processor and storing instructions that, when executed by the at least one processor, perform operations comprising:

mapping, in both a time domain and a frequency domain, the UL control information to a radio resource in a transmission time interval (TTI), the UL control information comprising (i) hybrid automatic retransmission request-acknowledgement/non-acknowledgement (HARQ-ACK), and (ii) a rank indicator (RI); and transmitting the UL control information to a base station (BS), using the radio resource to which the UL control information is mapped in the TTI, wherein mapping, in both the time domain and the frequency domain, the UL control information to the radio resource in the TTI comprises:

based on (i) the TTI having a time duration of two symbols, (ii) a demodulation reference signal (DMRS) not being mapped to any of the two symbols in the TTI, and (iii) the DMRS being mapped to another TTI that is subsequent in time to the TTI:

mapping the HARQ-ACK to an initial symbol among the two symbols in the TTI, in descending order of frequency from a resource element (RE) of a highest frequency index for the initial symbol; and mapping the RI to a last symbol among the two symbols in the TTI, in descending order of frequency from an RE of a highest frequency index for the last symbol.

9. The terminal according to claim 8, wherein mapping, in both the time domain and the frequency domain, the UL control information to the radio resource in the TTI further comprises:

based on (i) the TTI having a time duration of three symbols, and (ii) the DMRS being mapped to an initial symbol among the three symbols in the TTI:

mapping both the HARQ-ACK and the RI to a middle symbol among the three symbols in the TTI, and mapping a sounding reference signal (SRS) to a last symbol among the three symbols in the TTI, wherein the HARQ-ACK and the RI are mapped to different frequencies for the middle symbol.

10. The terminal according to claim 8, wherein the terminal is configured to support a plurality of TTI time durations and a plurality of subcarrier spacing, and wherein a maximum number of coded symbols to which the UL control information is to be mapped is limited by a product of (i) a number of symbols to which the UL control information is mapped, and (ii) a number of subcarriers corresponding to a channel to which the UL control information is to be transmitted.

11. The terminal according to claim 10, wherein the number of symbols to which the UL control information is mapped is different for each of the plurality of TTI time durations.

12. The terminal according to claim 8, wherein transmitting the UL control information to the BS, using the radio resource to which the UL control information is mapped in the TTI, comprises:
  transmitting the UL control information in an UL data channel with the TTI having a shorter length than 1 ms.

13. The terminal according to claim 8, wherein, based on (i) the TTI having a time duration of two symbols, and (ii) the DMRS being mapped to one of the two symbols in the TTI:
  the DMRS is mapped to one of the two symbols using fewer than all resource blocks (RBs) in the frequency domain.

14. The terminal according to claim 13, wherein mapping, in both the time domain and the frequency domain, the UL control information to the radio resource in the TTI further comprises:
  based on (i) the TTI having a time duration of two symbols, and (ii) the DMRS being mapped to one of the two symbols using fewer than all RBs in the frequency domain:
    mapping the HARQ-ACK or the RI to the other of the two symbols using only a resource element (RE) having a same frequency index as an RE to which the DMRS is mapped in the frequency domain.

15. A method of receiving uplink (UL) control information by a base station (BS) in a wireless communication system, the method comprising:
  receiving, from a terminal, UL control information that is mapped, in both a time domain and a frequency domain, to a radio resource in a transmission time interval (TTI); and
  determining, from the UL control information, (i) hybrid automatic retransmission request-acknowledgement/non-acknowledgement (HARQ-ACK), and (ii) a rank indicator (RI),
  wherein, based on (i) the TTI having a time duration of two includes three symbols, iii) a demodulation reference signal (DMRS) not being mapped to any of the two symbols in the TTI, and (iii) the DMRS being mapped to another TTI that is subsequent in time to the TTI:
    the HARQ-ACK is mapped to an initial symbol among the two symbols in the TTI, in descending order of frequency from a resource element (RE) of a highest frequency index for the initial symbol, and
    the RI is mapped to a last symbol among the two symbols in the TTI, in descending order of frequency from an RE of a highest frequency index for the last symbol.

16. The method according to claim 1, wherein the UL control information further comprises at least one of (iii) a channel quality indicator (CQI), or (iv) a precoding matrix indicator (PMI).

17. The terminal according to claim 8, wherein the UL control information further comprises at least one of (iii) a channel quality indicator (CQI), or (iv) a precoding matrix indicator (PMI).

* * * * *